Jan. 6, 1953     G. ZELENKO     2,624,403
WINDOW PROTECTOR

Filed May 24, 1951     2 SHEETS—SHEET 1

INVENTOR.
GUSTAVE ZELENKO
BY
ATTORNEY

INVENTOR.
GUSTAVE ZELENKO
BY
ATTORNEY

Patented Jan. 6, 1953

2,624,403

UNITED STATES PATENT OFFICE 2,624,403

WINDOW PROTECTOR

Gustave Zelenko, Long Island City, N. Y.

Application May 24, 1951, Serial No. 227,975

1 Claim. (Cl. 160—100)

This invention relates to new and useful improvements in window protectors.

More specifically, the present invention proposes the construction of a novel window protector which is always in position on the outer side of a window to be lowered into position across the outer sides of the window sashes to protect the outer faces of the window panes from being splashed up and dirtied during rain storms, snow storms and the like.

Another object of the present invention proposes forming the protector of an elongated sheet of flexible material which is secured at one end to a spring urged roller supported across the top of the window frame at the outer sides of the sashes in a manner so that the protector will always be in position to be lowered when a storm starts to protect and maintain the window panes clean.

The present invention further proposes means for securing the lower end of the sheet of flexible material in position in a manner so that it will not be free to blow around in the high winds which often accompany such storms.

A further object of the present invention proposes forming the sheet of flexible material of any desired waterproof material; however, it is preferred to use one of the clear thermoplastic materials in a manner so that when the protector is lowered to its operative position the protector will not interfere with a view through the window.

Still another object of the present invention proposes the provision of a means for anchoring the vertical side edges of the sheet of flexible material against the outer sides of the window sashes in a manner to retain those edges from being blown away from the sashes permitting rain and snow to enter at the sides of the protector and dirty the window panes.

It is a further object of the present invention to construct a window protector which is simple and durable, which is efficient for its intended purposes and which can be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
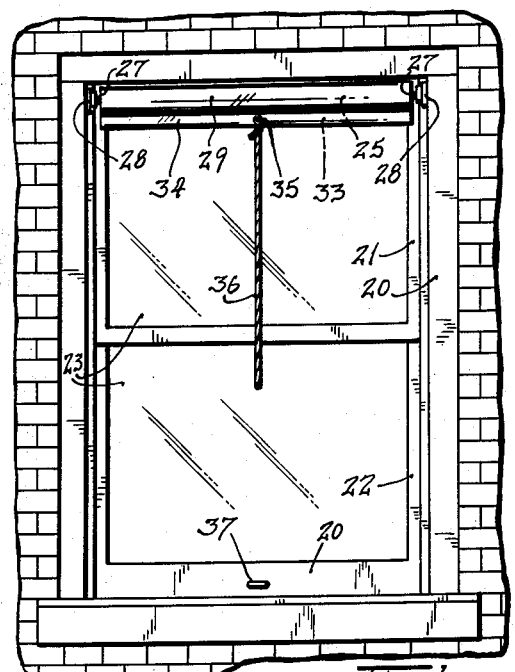
Fig. 1 is an outside elevational view of a window provided with a protector constructed in accordance with the present invention.
Figure 4:
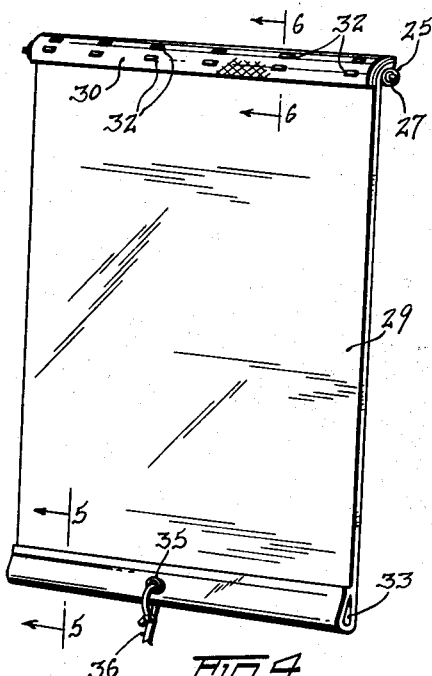
Fig. 4 is a perspective view of the protector, per se.

The window protector, according to the first form of the invention illustrated in Figs. 1 to 6, is shown applied to a window of the double hung type having a frame 20 slidably supporting an outer or upper sash 21 and a lower or inner sash 22. The sashes 21 and 22 have the usual transparent panes 23 of glass or similar material. Further details of the construction of the window will not be given in this specification as they form no part of the present invention and are generally known to those skilled in the art.

The protector includes a spring urged roller 25 of a type similar to that commonly used in the window shade art and which is mounted across the frame 20 at the top thereof and at the outer sides of the sashes 21 and 22. Internally, the roller 25 has the usual coil spring 26, see Fig. 6, which is loaded when the roller is turned in one direction to turn the roller in the reverse direction when the roller is again released. At its ends, the roller 25 is provided with the usual window shape type trunnions 27 received in brackets 28 secured in position on opposite sides of the window frame 20 to rotatively support the roller.

Secured at one end to the roller 25, there is an elongated sheet of flexible material 29. The sheet of flexible material 29 can be formed of any waterproof material such as oiled silk, oil cloth or the like; however, it is preferred to form the sheet of flexible material of one of the transparent thermoplastic materials so as not to interfere with the view through the panes 23 of the window sashes 21 and 22. Suitable clear thermoplastic materials that can be used for the sheet of flexible material are Vinylite (copolymer of vinyl acetate and vinyl chloride), Lucite (polymerized methyl methacrylate), Celluloid (cellulose nitrate product) and polystrene (polymer of styrene).

Figures 5, 6:
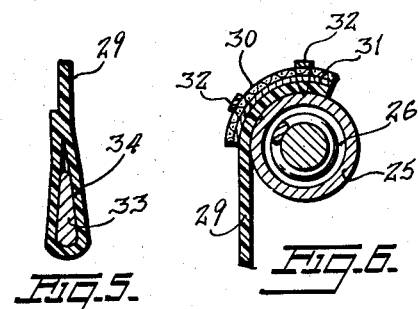
Fig. 5 is an enlarged partial longitudinal sectional view taken on the line 5—5 of Fig. 4.
Fig. 6 is an enlarged partial longitudinal sectional view taken on the line 6—6 of Fig. 4.

The sheet of flexible material 29, at its end secured to the roller 25, is reinforced by a length of cloth material 30 secured in position by a layer of adhesive 31, see Fig. 6, having an affinity for the cloth material 30 and the sheet of flexible material 29. Staples 32 are passed through the length of cloth material 30, the end of the sheet of flexible material 29 and into the roller 25 securing the end of the sheet of flexible material 29 to the roller 25.

Means is provided for stiffening the other end of the sheet of flexible material 29. That stiffening means is characterized by a rod 33 of wood or the like which is extended through a tunnel 34 formed along the other end of the sheet of flexible material 29. The tunnel 34 is formed by doubling the end of the sheet of flexible material 29 over and heat sealing it in position, by the application of heat along the free end thereof, as shown in Fig. 5.

A grommet 35 is passed through the material of the sheet of flexible material 29 and the rod 33, intermediate the ends of the rod, so as to retain the rod in position in the tunnel 34. The grommet further permits one end of a length of cord 36 to be secured by knotting to the other end of the sheet of flexible material 29. When the protector is in the inoperative rolled up position, shown in Fig. 1, the free end of the cord 36 depends along the outer sides of the sashes 21 and 22.

Figure 3:
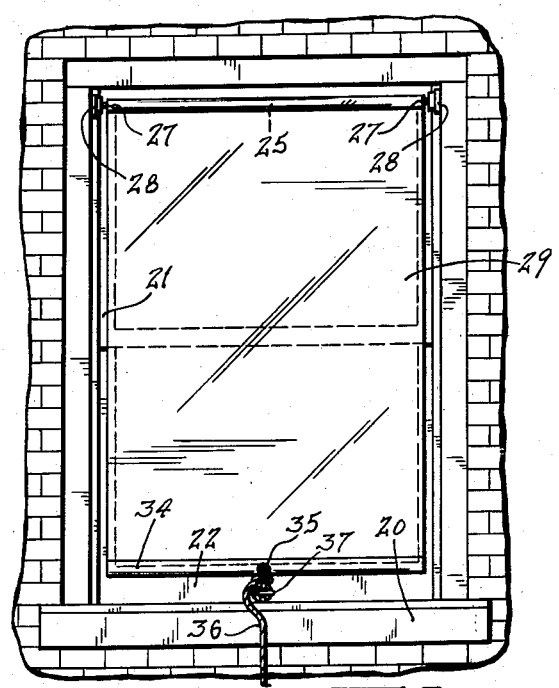
Fig. 3 is another view similar to Fig. 1 showing the protector in its operative lowered position.
Figure 8:
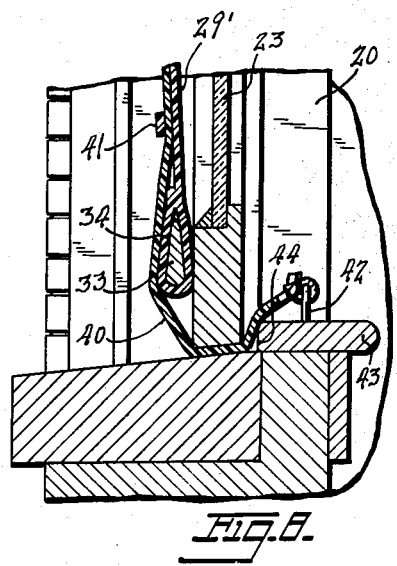
Fig. 8 is an enlarged partial vertical sectional view taken on the line 8—8 of Fig. 7.
Figure 7:
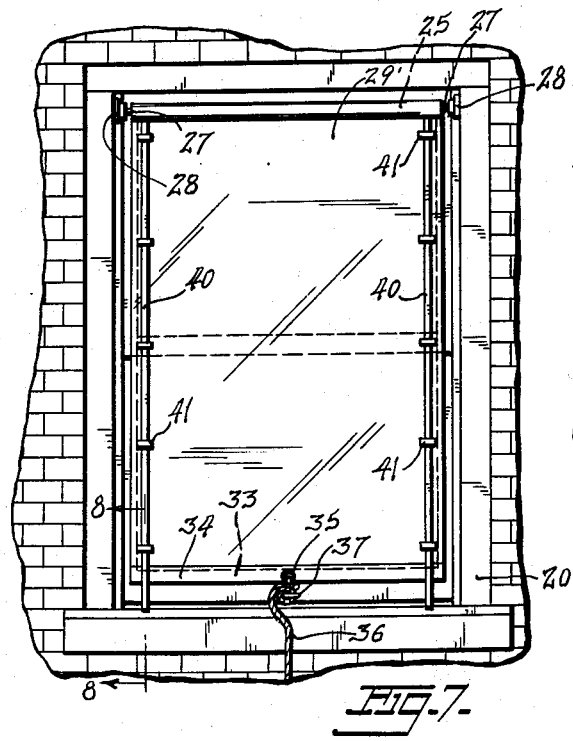
Fig. 7 is a view similar to Fig. 3, but illustrating the window protector constructed in accordance with a modification of the present invention.

Screwed into the bottom portion of the outer face of the lower or inner sash 22, there is an eyelet 37 to which the cord 36 is to be tied to maintain the sheet of flexible material 29 in the lowered operative position, shown in Fig. 3.

Figure 2:
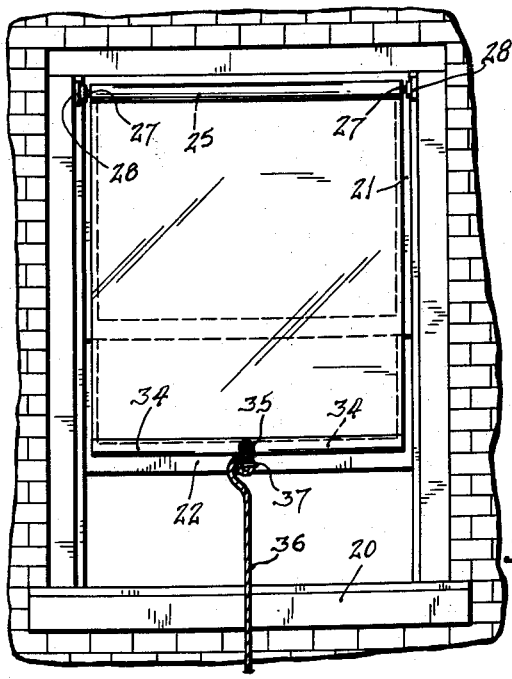
Fig. 2 is a view similar to Fig. 1 illustrating an intermediate step in the process of lowering the protector to its operative position.

The manner of using the window protector is as follows:

During clear sunshiny weather, the protector is in the raised inoperative position shown in Fig. 1 with the cord depending as shown in that figure. At the start of a rain or snow storm, the lower or inner sash 22 is raised slightly as shown in Fig. 2 so that one can reach out and take hold of the depended end of the cord 36. The cord 36 is pulled down and the free end laced through the eyelet 37 with downward pulling being continued until the tunnel end of the sheet of flexible material 29 strikes the eyelet 37. The cord is then knotted to the eyelet 37 anchoring the other end of the sheet of flexible material to the lower or inner sash 22. The lower or inner sash 22 is pushed down to its fully closed position shown in Fig. 3 to pull downward on the sheet of flexible material 29 so that it covers the entire outer surfaces of the panes 23 of the sashes 21 and 22.

The protector is left in the lowered position throughout the storm so that no rain or snow can splash against the panes 23 and mix with dirt and dust in the air to dirty the outer faces of the panes. When the sheet of flexible material 29 was being lowered, the roller 25 was being turned in a direction to load its spring 26 so that at the conclusion of the storm, the protector can be returned to its starting position by reversing the procedure for lowering the protector. When the sheet of flexible material 29 is being returned to its starting position, the tension in the spring 26 will function to rewind the sheet of transparent material into position on the roller 25.

The protector constructed in accordance with the modification of the invention shown in Figs. 7 to 10 is similar to that previously described, except for the provision of a means for reinforcing the vertical side edges of the sheet of flexible material 29'. The reinforcing means serves to keep the vertical side edges of the sheet of flexible material 29' from being blown away from the outer faces of the window sashes 21 and 22 so that rain and snow cannot be blown in about those vertical side edges to splash and dirty the window panes 23.

The reinforcing means comprises elongated strips of material 40 which are extended vertically along the outer face of the sheet of flexible material 29' at the vertical side edges thereof. The strips of material 40 are preferably formed of the same material as that used for the sheet of flexible material 29', but of a slightly heavier gauge. The top ends of the strips of material 40 are anchored beneath the length of cloth material 30 which reinforces the top edge of the sheet of flexible material 29' where it is secured to the roller 25.

Figure 10:
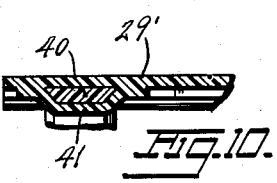
Fig. 10 is an enlarged partial transverse sectional view taken on the line 10—10 of Fig. 9.

Secured to the outer face of the sheet of flexible material 29', there are vertically spaced aligned loop members 41 through which the free ends of the strips of material 40 are slidably passed. The loop members 41 are formed of the same material that is used for forming the sheet of flexible material 29' and are heat sealed to the sheet of flexible material, as shown in Fig. 10.

Figure 9:
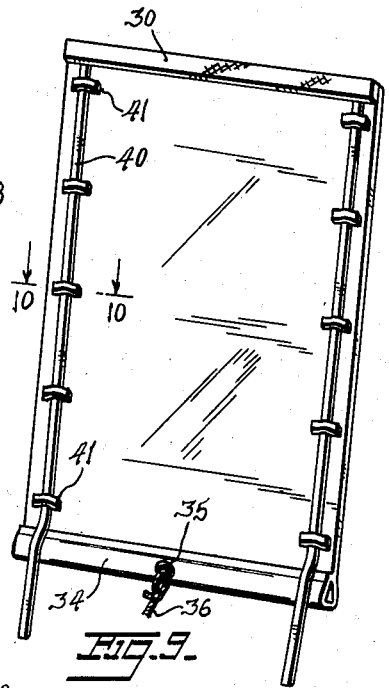
Fig. 9 is a perspective view of the protector constructed in accordance with the modification of the invention as it appears before being mounted on the roller.

Referring to Fig. 9, it will be apparent that the strips of material 40 are longer than the sheet of flexible material 29', so that the free ends of the strips of material 40 project beyond the other end of the sheet of flexible material 29'. When the protector is in the lowered operative position shown in Fig. 7, the free ends of the strips of material 40 are passed beneath the bottom edge of the lower or inner sash 22 and tied to eyelets 42, see Fig. 8, screwed into the window sill 43 at the inner side of the window frame 20. The outer edge of the window sash 43 is preferably formed with notches 44, see Fig. 8, providing clearance for the strips of material 40 so that they will not be pinched between the adjacent faces of the sill 43 and the lower or inner sash 22 in the lowered position of that sash.

In all other respects, the form of the invention shown in Figs. 7 to 10 is similar to that illustrated in Figs. 1 to 6 and like reference numerals are used for similar parts throughout the several views.

While the drawings of this application illustrate the protector as being applied to windows of the double hung type, that is by way of illustration only. The window protectors can be adapted to other types of windows without departing from the scope and intent of the present invention. The sheets of flexible material 29 and 29' are preferably formed of a clear thermoplastic material, but if desired the plastic materials could be colored to afford protection from the sun's rays so that the protector will have an added function in addition to its primary function of keeping the panes of the sashes clean.

It is to be understood that this arrangement will be helpful in an effort to prevent the dimming of windows produced by moisture and it also acts as a storm shield for windows.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A window protector comprising an elongated sheet of flexible material for attachment at one end to a spring roller mounted between the sides of a window frame at the outer sides of the sashes thereof to be wound on the roller, a cord extending from the other end of said sheet of material for unwinding said sheet of material to extend it downward across the sashes thereby covering the outer sides thereof, means for anchoring said cord to hold said sheet of flexible material in position across the outer sides of the sashes, and means for reinforcing the vertical side edges of said sheet of flexible material in the lowered position thereof, said reinforcing means comprising strips of material extended along the outer face of the sheet of flexible material along the vertical side edges thereof, vertically spaced loops mounted along the vertical side edges of said sheet of material through which said strips of material are slidably passed, means securing the top ends of said strips of material to the one end of said sheet of flexible material, said strips of material being longer than said sheet of flexible material having their bottom ends extend beyond the other end of the sheet of flexible material and being passed about the bottom edge of the lower of the sashes and being anchored to the window frame.

GUSTAVE ZELENKO.

REFERENCES CITED

The following references are of record in the file of this patent:

UNITED STATES PATENTS

| Number | Name | Date |
| --- | --- | --- |
| 1,807,161 | Loven | May 26, 1931 |
| 1,911,232 | Large | May 30, 1933 |
| 2,096,897 | Herrmann | Oct. 26, 1937 |
| 2,386,986 | Shirley | Oct. 16, 1945 |
| 2,547,373 | Camp | Apr. 3, 1951 |